United States Patent
Bronicki (10) Patent No.: US 6,883,328 B2
(45) Date of Patent: Apr. 26, 2005

(54) HYBRID POWER SYSTEM FOR CONTINUOUS RELIABLE POWER AT REMOTE LOCATIONS

(75) Inventor: Lucien Y. Bronicki, Yavne (IL)

(73) Assignee: Ormat Technologies, Inc., Sparks, NV (US)

(*) Notice: Subject to any disclaimer, the term of this patent is extended or adjusted under 35 U.S.C. 154(b) by 220 days.

(21) Appl. No.: 10/152,356

(22) Filed: May 22, 2002

(65) Prior Publication Data

US 2003/0218385 A1 Nov. 27, 2003

(51) Int. Cl.$^7$ ................................................. F01K 1/00
(52) U.S. Cl. ........................... 60/670; 60/646; 60/657
(58) Field of Search ....................... 60/618, 670, 614, 60/616, 597, 682, 646, 657

(56) References Cited

U.S. PATENT DOCUMENTS

| | | | |
|---|---|---|---|
| 3,979,913 A | * 9/1976 | Yates | 60/618 |
| 4,197,712 A | * 4/1980 | Zwick et al. | 62/50.3 |
| 4,429,534 A | * 2/1984 | Joy | 60/618 |
| 4,590,384 A | 5/1986 | Bronicki | |
| 4,982,569 A | 1/1991 | Bronicki | |
| 5,724,814 A | * 3/1998 | Ven et al. | 60/618 |

OTHER PUBLICATIONS

"Raising the Reliability of Advanced Gas Turbines," Power, vol. 146, No. 2, Mar./Apr. 2002.
Dry Hybrid Cycle Power System [online], 2002 [retrieved on Aug. 6, 2002]. Retrieved from the internet: <http://www.siemenswestinghouse.com/en/fuelcells/hybrids/performance/index.cfm>.

* cited by examiner

Primary Examiner—Hoang Nguyen
(74) Attorney, Agent, or Firm—Nath & Associates PLLC; Gary M. Nath; Jerald L. Meyer

(57) ABSTRACT

The present inventive subject matter is thus drawn to a hybrid ultra reliable power generating system for supplying continuous reliable power at remote locations comprising: a primary power unit producing electric power that is supplied to a load. And a secondary power unit in the form of a closed cycle vapor turbine (CCVT) system that is capable of producing 100% of the electric power that is produced by the primary power unit and which is heated in hot standby by rejected heat of the primary power unit, wherein the vaporizer of the CCVT is maintained during hot standby at a temperature above its nominal operating temperature and the vapor turbine of the CCVT is preferable maintained at idle during hot standby at a rotating speed.

Preferably, the CCVT includes a burner that combusts the same fuel as the primary power unit and supplies sufficient heat so that the CCVT produces 100% of power produced by the primary unit to the load once the primary power units stops operation.

20 Claims, 9 Drawing Sheets

FIG.1  PRIOR ART: CONVENTIONAL COMBINED CYCLE (TYPICAL)

FIG.2  PROPOSED SYSTEM (EXAMPLE)

HYBRID POWER SYSTEM FOR CONTINUOUS RELIABLE POWER AT REMOTE LOCATIONS

BACKGROUND OF THE INVENTION

1. Technical Field

This invention relates to a method and apparatus for producing power, and more particularly, to a method and apparatus for producing ultra-reliable power with redundancy which requires little maintenance or supervision and with improved fuel consumption.

2. Background of the Invention

The requirements for reliable power supply are more and more stringent with the advance of modern industry, computer and telecommunications systems and with the increasing costs of non-supply electricity. This particularly applies for on-site generation of electricity, be it for grid connected and distributed generation or off-grid prime power supply at remote locations. The conventional solutions for providing high efficiency on-site generation of electricity include, for short periods of interruption, battery or flywheel uninterruptible power supply (UPS) systems are used; and for longer periods, engine driven generators such as diesel generators are used for both applications relying on grid power, as well as for distributed generation and off-grid applications. The short term standby power using batteries has a distinct disadvantage when failure occur. This is especially true since there is no satisfactory diagnostic system to detect failures of batteries on standby: a single cell failure can cause failure of the whole battery pack. Expensive climate control and limited life are also drawbacks of battery systems. In addition, while flywheel systems do not have the diagnostic problem, the systems can support the load for even less time than the battery systems.

The diesel generators used for longer periods of standby operation, however, have problems of unreliable startups and require frequent maintenance and periodic overhaul. Fuel cells and stirling engines can also be used but fuel cells have too long of a startup process and these systems are still in the development stage and have no proven reliability.

Combined cycle power plants, on the other hand, i.e., a power plant having usually a gas turbine and a bottoming cycle power generating unit, have a quite high overall efficiency since heat contained in the exhaust gases of the primary power generating unit is utilized in the bottoming cycle power generating unit to produce electric power. However, the reliability of such systems can be questionable. For example, see the article "Raising the Reliability of Advanced Gas Turbines," Power, Vol. 146, No. 2, March/April 2002, which reports that there are several reliability issues that need to be addressed when using combined cycle power plants.

For power generation systems that supply remote telecommunications with high reliable off-grid power, several options are available including: multiple diesel generators (MDG), photovoltaics, photovoltaics combined with diesel generators, thermoelectric generators (TEG), and closed cycle vapor turbogenerators (CCVT).

Multiple diesel generators (MDG) with one generator operating and one or two generators on standby has an advantage in that these systems have low fuel consumption and can operate using liquid or gaseous fuel. A multiple diesel generator system, however, depends on the reliability of the start-up of a standby generator if the operating generator fails. This necessitates a large battery to be included in the system so that it can be used in the event that the standby generator does not start. Further, the included large batteries typically require climate control in the form of heating or air conditioning, thus increasing the complexity and fuel consumption of the system for a given load.

In photovoltaic systems, batteries are used to compensate for the hours/days without solar radiation. Batteries in photovoltaic systems are usually quite large and work on deep discharge cycles. Because of the deep discharge cycles nickel-cadmium are better suited in photovoltaic systems than lead acid batteries. The cost of nickel-cadmium batteries is very high. In addition to the high cost of batteries, the life-span of these batteries is usually less than 10 years. Maintenance, vandalism and theft of the batteries of photovoltaic are additional concerns for photovoltaic systems.

Photovoltaic systems having a diesel generator back-up share the same problems as the previously-mentioned strictly photovoltaic systems, namely, cost, life-span and maintenance of batteries as well as risk of vandalism and theft. In addition, utilizing a diesel generator as a back-up power source can produce reliability issues as the system redundancy depends on an unreliable diesel engine start.

As far as thermoelectric generators (TEG) are concerned, the TEG system has the highest fuel consumption of any of the systems thus far discussed. The high fuel consumption is aggravated by the fact that a TEG system is a constant power device that requires a dummy load for dissipating any excess energy and, thus requiring additional fuel consumption due to the over-sizing of the unit, output variations due to ambient conditions or varying load requirements. If additional batteries are not used, the battery will not be properly charged and will require additional maintenance and manual charging during maintenance and thus the life span of the battery will decrease. Additionally, TEG systems have a high fuel consumption and the life span of a TEG system is typically less than 10 years.

A more recent development in providing reliable power to remote locations has been the introduction of fuel cells. A fuel cell is an energy conversion device that generates electricity and heat by electrochemically combining a gaseous fuel and an oxidant gas via an ion conducting electrolyte. The main characteristic of a fuel cell is its ability to convert chemical energy directly into electrical energy without the need for heat conversion (i.e., converting heat to electric or mechanical power optimized in accordance with the Second Law of Thermodynamics), giving much higher conversion efficiencies than heat engines (e.g., engine generators, CCVT's or TEG's). A system having such fuel cells and a gas turbine for achieving high efficiencies has been proposed by Siemens Westinghouse, as indicated in their website. However, the fuel cell technology is not mature and the life and reliability of the fuel cells are not sufficient to maintain reliable remote power without a proven backup for when the fuel cell fails.

Finally, the closed cycle vapor turbogenerator (CCVT) systems have a fuel consumption which, although lower than the TEG system, is much higher than that of a diesel generator. Redundancy for these systems is usually achieved through the use of one or two operating CCVTs; with one CCVT on warm standby. Fuel consumption varies in accordance with the load but the use of two CCVT each operating at half load consumes 20% more fuel than one load at 100% load.

U.S. Pat. No. 4,590,384, the disclosure of which is hereby incorporated by reference, discloses a peak shaving power plant for utilizing a source of low grade heat comprising a Rankine cycle turbine having an organic working fluid utilizing heat from a low grade heat source, a generator driven by the turbine and having a generating capacity in excess of the capacity of the turbine, and a fast starting prime mover, such as an internal combustion engine, having a capacity that is less than the generating capacity of the generator. A selectively operable coupling connects the output of the fast starting prime mover to the generator so that, on demand, the fast starting prime mover can drive the generator providing peak power shaving in the amount of the capacity of the prime mover.

In U.S. Pat. No. 4,982,569, the disclosure of which is hereby incorporated by reference, a hybrid power plant is disclosed and includes an intermittently operable non-fuel consuming power generator, such as a photovoltaic cell array, or a wind generator, connected through a control-circuit to a battery for charging the same during operation of the power generator, and for supplying current to a time-wise, substantially constant, electrical load. In addition, the hybrid power plant includes an electric generator connected to a standby operable prime mover, such as a Rankine cycle organic fluid turbogenerator, for charging the battery and supplying current to the electrical load when the intermittently operable non-fuel consuming power generator is not operating. In the case of a photovoltaic array, this situation occurs at night so that the prime mover of the hybrid power plant can be started as it becomes dark.

It is therefore an object of the present invention to provide a new and improved method of and apparatus for providing ultra-reliable power wherein the disadvantages of high fuel consumption, unreliability, maintenance, use of batteries and the associated climate control (which increases the power consumption and maintenance, thus reducing the reliability) as outlined above are reduced or substantially overcome.

SUMMARY OF THE INVENTION

The present inventive subject matter is drawn to an apparatus that combines a fuel efficient, but failure prone, primary power generation unit system such as a high temperature fuel cell (e.g., solid oxide fuel cell (SOFC) or molten carbonate fuel cell (MCFC)), an engine generator (diesel or gas fueled, e.g. a diesel engine (DE), a diesel generator (DG), or a gas engine generator (GEG)), a gas turbine generator (operating on gas or liquid fuel, e.g., a gas turbine generator), or a stirling engine (STE), with a secondary power unit that is a very high reliability closed cycle vapor turbine (CCVT) which operates according to a Rankine cycle using steam or organic working fluid that is capable of producing 100% of the electric power that is produced by the primary power unit and which is heated in hot standby by rejected heat of the primary power unit, whereas the vaporizer of the CCVT is maintained during hot standby at a temperature above its nominal operating temperature and the vapor turbine of the CCVT is preferably maintained at idle during hot standby at a rotating speed above its nominal rotating speed.

The present inventive subject matter is thus drawn to a hybrid ultra reliable power generating system for supplying continuous reliable power at remote locations comprising: a primary power unit producing electric power, such as a high temperature fuel cell (SOFC or MCFC) or an engine generator (DE, DG, or GEG), a gas turbine generator operating on gas or liquid fuel (GTG), or a stirling engine (STE), that is supplied to a load; and a secondary power unit in the form of a closed cycle vapor turbine (CCVT) system, which operates according to a Rankine cycle using steam or organic working fluid, that is capable of producing 100% of the electric power that is produced by the primary power unit and which is heated in hot standby by rejected heat of the primary power unit, wherein the vaporizer of the CCVT is maintained during hot standby at a temperature above its nominal operating temperature and the vapor turbine of the CCVT is preferably maintained at idle during hot standby at a rotating speed above its nominal rotating speed. Preferably, the CCVT includes a burner that combusts the same fuel as the primary power unit and supplies sufficient heat so that the CCVT produces 100% of the power produced by said primary power unit to the load once the primary power unit stops operation.

The present invention also relates to a method for supplying continuous reliable power at remote locations comprising the steps of: providing a primary power unit producing electric power, such as a high temperature fuel cell (SOFC or MCFC), an engine generator (DE, DG or GEG), a gas turbine generator operating on gas or liquid fuel (GTG), or a stirling engine (STE), that is supplied to a load; and providing a secondary power unit in the form of a closed cycle vapor turbine (CCVT) system which operates according to a Rankine cycle using steam or organic working fluid, that is capable of producing 100% of the electric power that is produced by the primary power unit and which is heated in hot standby by rejected heat of the primary power unit, wherein the vaporizer of the CCVT is maintained during hot standby at a temperature above its nominal operating temperature and the vapor turbine of the CCVT is preferably maintained at idle during hot standby at a rotating speed above its nominal rotating speed. Preferably, the method also includes the step of providing a burner in the CCVT that combusts the same fuel as the primary power unit and supplies sufficient heat so that the CCVT produces 100% of the power produced by said primary power unit to the load once the primary power unit stops operation.

BRIEF DESCRIPTION OF THE DRAWINGS

A description of the present inventive subject matter including embodiments thereof is presented and with reference to the accompanying drawings, the description is not meant to be considered limiting in any manner, wherein.

Like reference numerals and designations in the various drawings refer to like elements.

DETAILED DESCRIPTION

Figure 1:
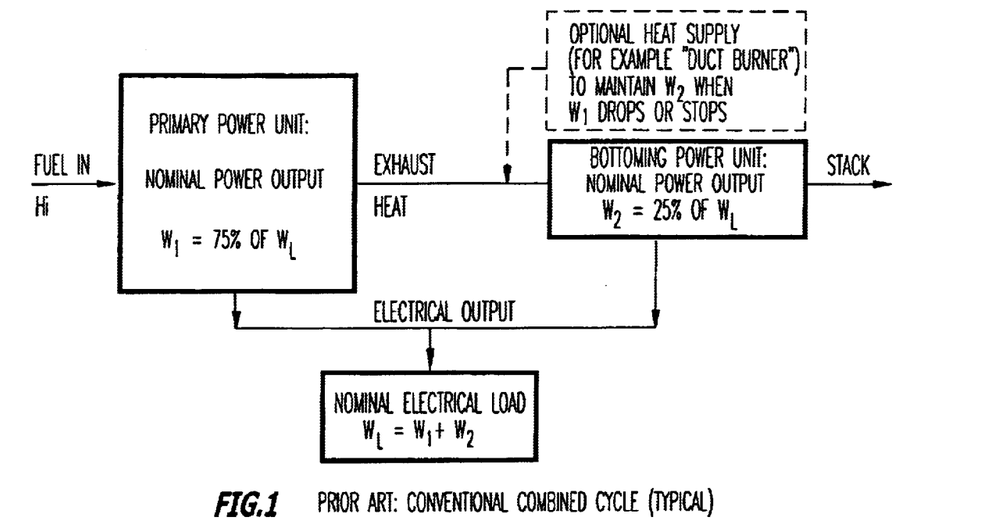
FIG. 1 is a graphical representation of a conventional combined-cycle power plant.

Turning now to the Figures, FIG. 1 represents a conventional high-efficiency combined-cycle power plant that is well-known in the art. As can be seen from the figure, fuel is supplied to a primary power unit which produces nominal power output. The power output of the primary power unit is generally about 60–80% of the required load. Heat is also exhausted from the primary power unit and supplied to a bottoming power unit, wherein power is produced and supplied to the load. In the conventional combined-cycle power plant as shown in FIG. 1, the ability of the bottoming power unit to produce electricity depends on the exhausted heat from the primary power unit. In other words, if the primary power unit suddenly stops working, the heat to the bottoming unit also stops and the bottoming power unit no longer is able to function.

The cascading heat from the primary power unit to the bottoming power unit increases the overall efficiency of the combined-cycle power plant in that the waste heat from the primary power unit is put to work by the bottoming power unit. In addition, an optional heater or "duct burner" is sometimes provided for maintaining the output of the bottoming cycle power unit when the output of the primary power unit drops due to high ambient temperature (the output of the system is sensitive to the air temperature). The duct burner allows for a constant heat flow to be supplied to the bottoming power unit.

Figure 2:
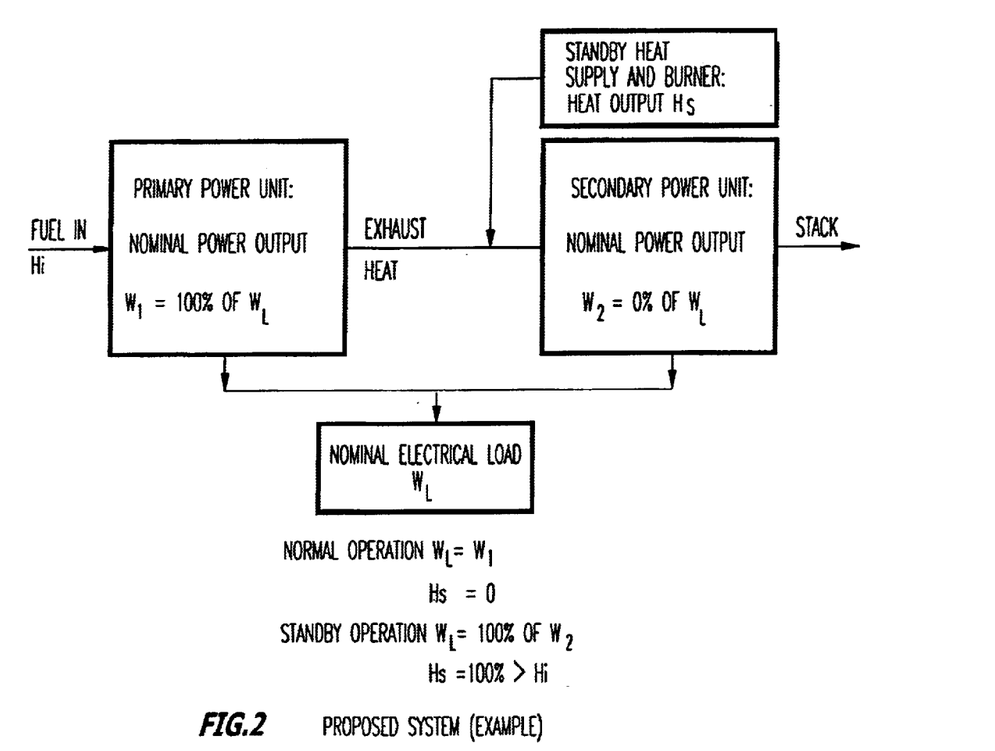
FIG. 2 is a graphical representation of a hybrid power plant shown in conjunction with the present inventive subject matter.

The hybrid power generating system of the present inventive subject matter, on the other hand, is graphically represented in FIG. 2. As can be seen from the figure, fuel is supplied to a primary power unit which produces nominal power output. The power output of the primary power unit is generally about 100% of the required load. Heat is also exhausted from the primary power unit and supplied to a secondary power unit, wherein the secondary power unit is kept in hot stand by. In general, the exhausted heat from the primary power unit is sufficient to keep a vaporizer of the secondary power unit operating above its normal operating temperature and pressure. Further, a burner that operates on the same fuel as the primary power unit is provided to supply heat to the secondary power unit once the primary power unit fails.

The ability of the rejected or exhausted heat from the primary power unit to keep the secondary power unit in hot standby mode contributes to the reliability and redundancy of the present inventive system. It is an important aspect of the present inventive subject matter that the secondary power plant be sized to be able to supply 100% of the electrical load upon failure of the primary power unit. In accordance with the present inventive subject matter, the hybrid power generating system preferably also includes a rotating capacitor that improves its power factor.

Hot standby is defined to mean maintaining the vaporizer of the secondary power unit, a closed cycle vapor turbine (CCVT) which operates according to a Rankine cycle using steam or organic working fluid, at a temperature above its nominal operating temperature.

Idle is defined to mean maintaining the turbine of the CCVT at a rotational speed above its nominal operating rotational speed.

Warm standby is defined to mean maintaining the vaporizer of the CCVT at a temperature at about the same or lower temperature than its nominal operating temperature and maintaining the turbine of the CCVT at a rotational speed at about the same or lower speed than its nominal operating rotational speed. However, in the warm standby state, the turbine of the CCVT may not be rotated at all. Usually, in the warm standby state, a battery will be used in order to ensure that electric power continues to be supplied to the load at the required level when the primary power unit stops supplying electric power and until the secondary power unit, the CCVT, reaches 100% of the electric power level of the primary power unit and commences supplying electric power to the load at that level.

Figure 3:
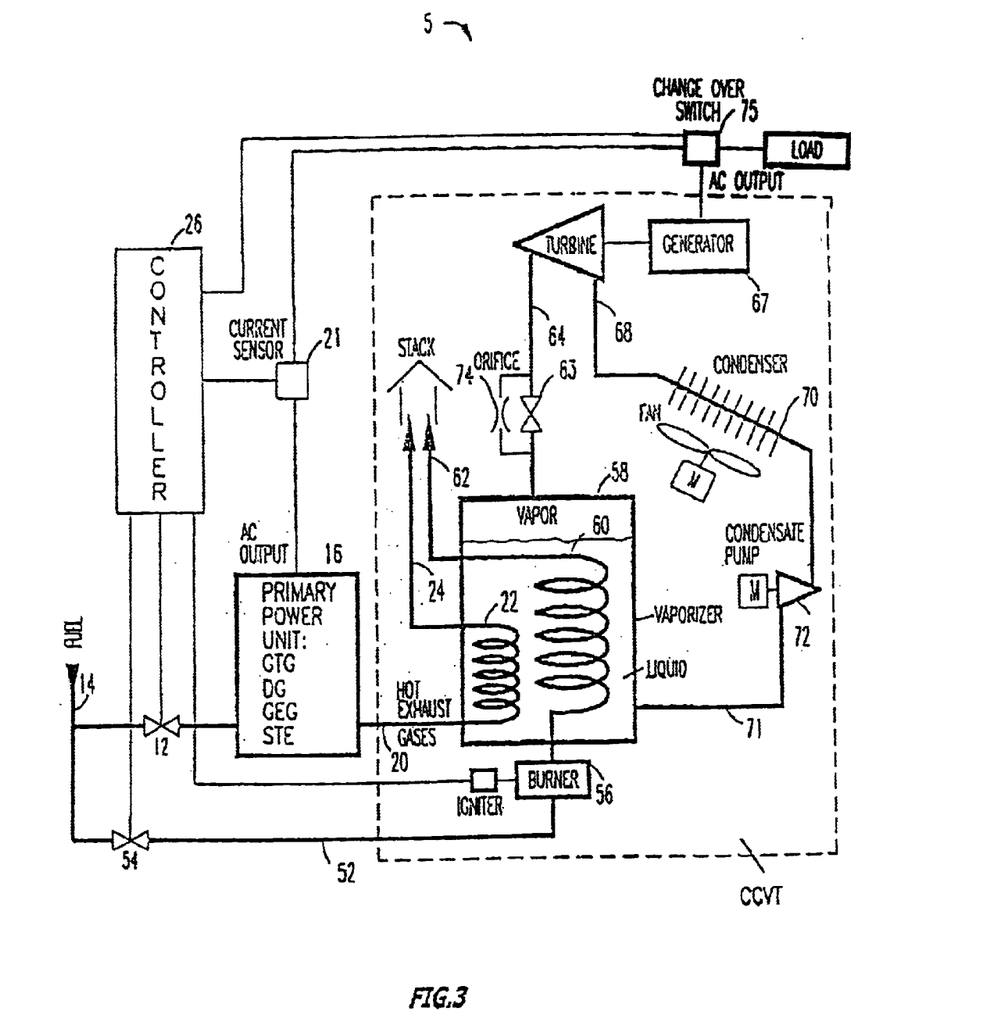
FIG. 3 is a schematic diagram of an embodiment of the present invention.

Referring now to FIG. 3, reference numeral 5 of FIG. 3 designates an embodiment of the present invention wherein the hybrid ultra reliable power generating system has primary power unit 16 and a secondary power unit that is a closed cycle vapor turbogenerator (CCVT) system which operates according to a Rankine cycle using steam or organic working fluid and is maintained in hot standby by the exhaust gases of primary power unit 16.

Fuel is supplied to the primary power unit 16 by fuel supply line 14 via fuel valve 12. Fuel valve 12 is connected with controller 26. Under normal operating conditions fuel valve 12 is open, allowing fuel to be supplied to primary power unit 16. Hot exhaust gases containing rejected heat of primary power unit 16 are supplied to vaporizer 58 by primary power unit exhaust line 20 where heat from the hot exhaust gases is transferred to the liquid in vaporizer 58 via heat exchange device 22. The exhaust gases from primary power unit 16 heat the working fluid in vaporizer 58 allowing the secondary closed cycle vapor turbogenerator (CCVT) system to remain in hot standby. Cooled exhaust exit vaporizer 58 via exhaust pipe 24. The rejected heat in the exhaust gases is sufficient to maintain the temperature and pressure of the vaporizer above the normal operating temperature and pressure. The power produced by primary power unit 16 is sensed by sensor 21. Sensor 21 is connected to controller 26 which monitors power produced by primary power unit 16. Under normal operating conditions, the power produced by primary power unit 16 is substantially sufficient for supplying the desired load and the power produced by the secondary CCVT system is zero.

In the event of a failure of primary power unit 16, sensor 21 detects the loss of power. Controller 26 closes fuel valve 12 which supplies fuel to primary power unit 16. Controller 26 then opens fuel valve 54 which is located on fuel supply line 52. Fuel supply line 52 supplies fuel to burner 56 of the secondary CCVT system. Controller 26 sends a signal igniting burner 56. Burner 56 heats vaporizer 58. Combustion gases produced by burner 56 flow through vaporizer 58 via heat exchanging device 60, with cooled exhaust gases exiting vaporizer 58 by means of exhaust conduit 62. Controller 26 sends a signal opening valve 63, located on the secondary CCVT system vapor conduit 64. Vaporized working fluid from vaporizer 58 proceeds through vapor conduit 64 to turbine 66 causing turbine 66 to do work by rotation. Generator 67 coupled to turbine 66 converts the rotational work produced into electric power. The expanded working fluid vapor exhausted from turbine 66 is supplied by expanded working fluid vapor exhaust conduit 68 to condenser 70. The expanded working fluid vapor is condensed in condenser 70 and the condensate produced is returned to vaporizer 58 through return conduit 71 via pump 72.

Sensor 75 senses the electric power supplied by the secondary CCVT system, relaying the information to controller 26. Orifice 74 is provided in order to allow vapor from vaporizer 58 to be supplied to turbine 66 under normal operating condition, i.e., when the secondary CCVT system is not supplying any electrical output to the load. In addition, turbine 66 is rotated during normal operating conditions in order to facilitate faster startup once primary power unit 16 fails. This enables the system to utilize the rotational inertia of turbine 66 when first supplying electricity to the load after failure of the primary power supply.

As has been stated above, it is an important aspect of this embodiment of the present inventive subject matter that the rejected heat from primary power unit 16 maintains vaporizer 58 above its normal operating temperature and pressure. By doing this, its thermal inertia may be utilized to ensure that vapor is continually produced and supplied to turbine 66.

In this embodiment of the present inventive subject matter, primary power unit 16 may be, without limitation, a diesel generator (DE or DG), a gas engine generator (GEG), a gas turbine generator (GTG), or a stirling engine generator (STE). In addition, primary power unit supplies AC output to the load.

Figure 4:
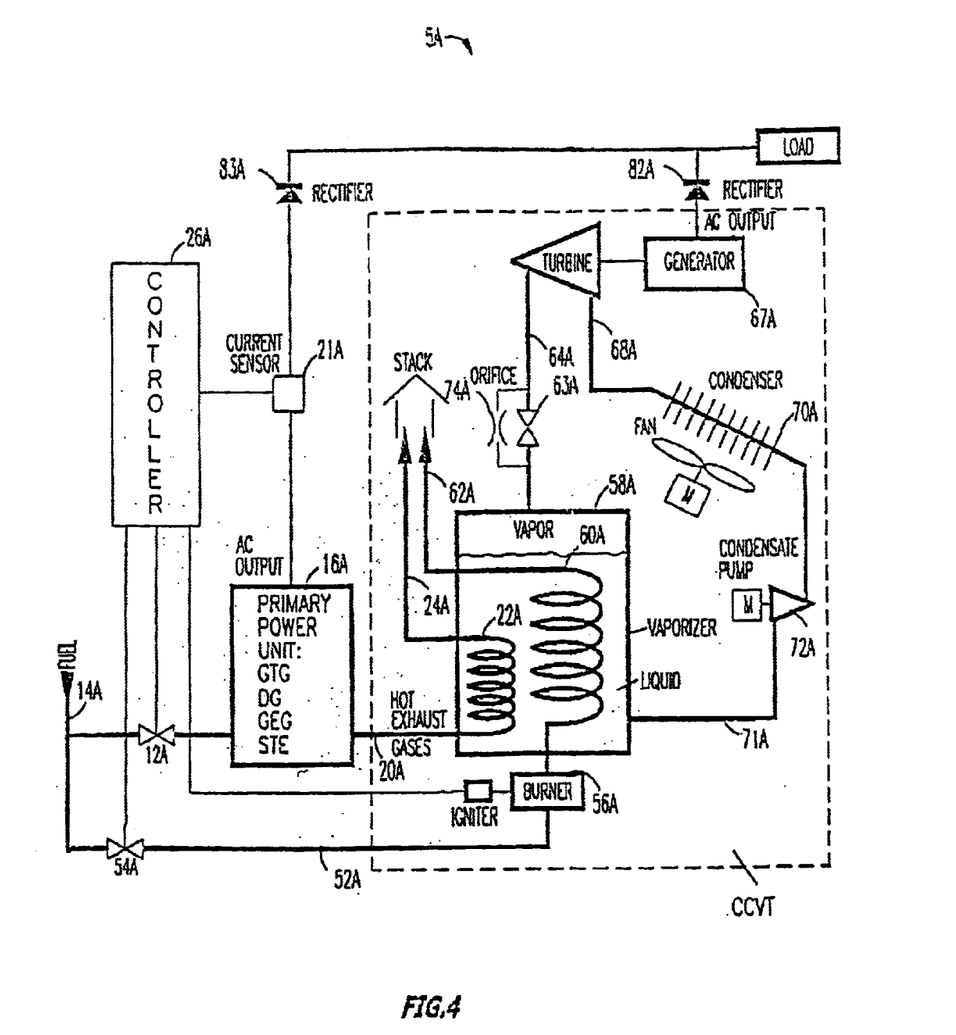
FIG. 4 is a schematic diagram of alternate embodiment of the present invention.

Referring now to FIG. 4, reference numeral 5A of FIG. 4 designates another embodiment of the present invention. This embodiment of the hybrid ultra reliable power generating system is substantially similar to the embodiment as described with respect to FIG. 3; however, in this embodiment, the output from the primary power unit is alternating current (AC) and therefore may have to be rectified prior to supplying it to the load. The embodiment represented by FIG. 4 has primary power unit 16A and a secondary power unit that is a closed cycle vapor turbogenerator (CCVT) system which operates according to a Rankine cycle using steam or organic working fluid and is maintained in hot standby by the exhaust gases of primary power unit 16A.

Fuel is supplied to the primary power unit 16A by fuel supply line 14A via fuel valve 12A. Fuel valve 12A is connected with controller 26A. Under normal operating conditions fuel valve 12A is open, allowing fuel to be supplied to primary power unit 16A. Hot exhaust gases containing rejected heat of primary power unit 16A are supplied to vaporizer 58A by primary power unit exhaust line 20A where heat from the hot exhaust gases is transferred to the liquid in vaporizer 58A via heat exchange device 22A. The exhaust gases from primary power unit 16A heat the working fluid in vaporizer 58A allowing the secondary closed cycle vapor turbogenerator (CCVT) system to remain in hot standby. Cooled exhaust gases exit vaporizer 58A via exhaust pipe 24A. The rejected heat in the exhaust gases is sufficient to maintain the temperature and pressure of the vaporizer above the normal operating temperature and pressure. The power produced by primary power unit 16A is sensed by sensor 21A. Sensor 21A is connected to controller 26A which monitors power produced by primary power unit 16A. Under normal operating conditions, the power produced by primary power unit 16A is substantially sufficient for supplying the desired load and the power produced by the secondary CCVT system is zero. In this embodiment, the electrical output of primary power unit 16A is in the form of alternating current (AC) electricity. Rectifier 80A rectifies the AC output of primary power unit 16A into a direct current (DC) output prior to the same being supplied to the load.

In the event of a failure of primary power unit 16A, sensor 21A detects the loss of power. Controller 26A closes fuel valve 12A which supplies fuel to primary power unit 16A. Controller 26A then opens fuel valve 54A which is located on fuel supply line 52A. Fuel supply line 52A supplies fuel to burner 56A of the secondary CCVT system. Controller 26A sends a signal igniting burner 56A. Burner 56A heats vaporizer 58A. Combustion gases produced by burner 56A flow through vaporizer 58A via heat exchanging device 60A, with exhaust gases exiting vaporizer 58A by means of exhaust conduit 62A. Controller 26A sends a signal opening valve 63A, located on the secondary CCVT system vapor conduit 64A. Vaporized working fluid from vaporizer 58A proceeds through vapor conduit 64A to turbine 66A causing turbine 66A to do work by rotation. Generator 67A coupled to turbine 66A converts the rotational work produced into electrical power. In this embodiment, the electrical output of generator 67A is in the form of alternating current (AC) electricity. Rectifier 82A rectifies the AC output of generator 67A into a direct current (DC) output prior to the same being supplied to the load. The expanded vaporized working fluid exhausted from turbine 66A is supplied by expanded working fluid vapor exhaust conduit 68A to condenser 70A. The expanded working fluid vapor is condensed in condenser 70A and the condensate produced is returned to vaporizer 58A through return conduit 71A via pump 72A.

Orifice 74A is provided in order to allow vapor from vaporizer 58A to be supplied to turbine 66A under normal operating condition, i.e., when the secondary CCVT system is not supplying any electrical output to the load. In addition, turbine 66A is rotated during normal operating conditions in order to facilitate faster startup once primary power unit 16A fails. This enables the system to utilize the rotational inertia of turbine 66A when first supplying electricity to the load after failure of the primary power supply.

As has been stated above, it is an important aspect of this embodiment of the present inventive subject matter that the rejected heat from primary power unit 16A maintain vaporizer 58A at or above its normal operating temperature and pressure. By doing this, its thermal inertia may be utilized to ensure that vapor is continually produced and supplied to turbine 66A.

In this embodiment of the present inventive subject matter, primary power unit 16A may be, without limitation, a diesel generator (DE or DG), a gas engine generator (GEG), a gas turbine generator (GTG), or a stirling engine generator (STE).

Figure 5:
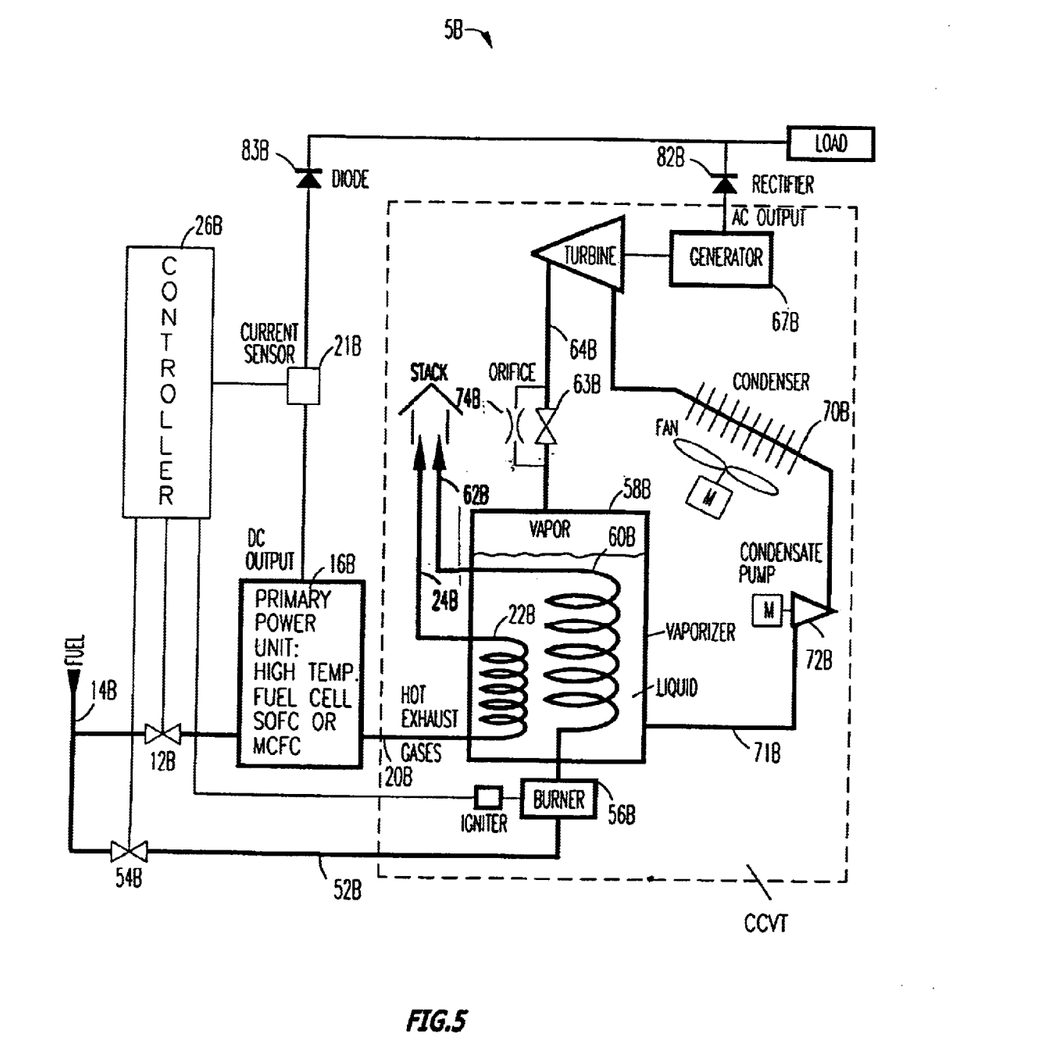
FIG. 5 is a schematic diagram of another embodiment of the present invention.

Referring now to FIG. 5, reference numeral 5B of FIG. 5 designates a further embodiment of the present invention. This embodiment of the hybrid ultra reliable power generating system is substantially similar to the embodiments as described with respect to FIGS. 3 and 4; however, in this embodiment, the primary power unit may be a high temperature fuel cell, a solid oxide fuel cell or a molten carbonate fuel cell, and the output is a direct current output. The embodiment represented by FIG. 5 has primary power unit 16B and a secondary power unit that is a closed cycle vapor turbogenerator (CCVT) system which operates according to a Rankine cycle and is maintained in hot standby by the exhaust gases of primary power unit 16B.

Fuel is supplied to the primary power unit 16B by fuel supply line 14B via fuel valve 12B. Fuel valve 12B is connected with controller 26B. Under normal operating conditions fuel valve 12B is open, allowing fuel to be supplied to primary power unit 16B. Hot exhaust gases containing rejected heat of primary power unit 16B are supplied to vaporizer 58B by primary power unit exhaust line 20B where heat from the hot exhaust gases is transferred to the liquid in vaporizer 58B via heat exchange device 22B. The exhaust gases from primary power unit 16B heat the working fluid in vaporizer 58B allowing the secondary closed cycle vapor turbogenerator (CCVT) system to remain in warm standby. Cooled exhaust gases exit vaporizer 58B via exhaust pipe 24B. The rejected heat in the exhaust gases is sufficient to maintain the temperature and pressure of the vaporizer at or above the normal operating temperature and pressure. The power produced by primary power unit 16B is sensed by sensor 21B. Sensor 21B is connected to controller 26B which monitors power produced by primary power unit 16B. Under normal operating conditions, the power produced by primary power unit 16B is substantially sufficient for supplying the desired load and the power produced by the secondary CCVT system is zero. In this embodiment, the electrical output of primary power unit 16B is in the form of direct current (DC) electricity. Diode 83B maintains the flow of the DC output of primary power unit 16B to the load.

In the event of a failure of primary power unit 16B, sensor 21B detects the loss of power. Controller 26B closes fuel valve 12B which supplies fuel to primary power unit 16B. Controller 26B then opens fuel valve 54B which is located on fuel supply line 52B. Fuel supply line 52B supplies fuel to burner 56B of the secondary CCVT system. Controller 26B sends a signal igniting burner 56B. Burner 56B heats vaporizer 58B. Combustion gases produced by burner 56B flow through vaporizer 58B via heat exchanging device 60B, with exhaust gases exiting vaporizer 58B by means of exhaust conduit 62B. Controller 26B sends a signal opening valve 63B, located on the secondary CCVT system vapor conduit 64B. Vaporized working fluid from vaporizer 58B proceeds through vapor conduit 64B to turbine 66B causing turbine 66B to do work by rotation. Generator 67B coupled to turbine 66B converts the rotational work produced into electrical power. In this embodiment, the electrical output of generator 67B is in the form of alternating current (AC) electricity. Rectifier 82B rectifies the AC output of generator 67B into a direct current (DC) output prior to the same being supplied to the load. The expanded working fluid vapor exhausted from turbine 66B is supplied by expanded working fluid vapor exhaust conduit 68B to condenser 70B. The expanded working fluid vapor is condensed in condenser 70B and condensate produced is returned to vaporizer 58B through return conduit 71B via pump 72B.

Orifice 74B is provided in order to allow vapor from vaporizer 58B to be supplied to turbine 66B under normal operating condition, i.e., when the secondary CCVT system is not supplying any electrical output to the load. In addition, turbine 66B is rotated during normal operating conditions in order to facilitate faster startup once primary power supply 16B fails. This enables the system to utilize the rotational inertia of turbine 66B when first supplying electricity to the load after failure of the primary power supply.

As has been stated above, it is an important aspect of this embodiment of the present inventive subject matter that the rejected heat from primary power unit 16B maintain vaporizer 58B above its normal operating temperature and pressure. By doing this, its thermal inertia may be utilized to ensure that vapor is continually produced and supplied to turbine 66B.

In this embodiment of the present inventive subject matter, primary power unit 16B may be, without limitation, a high temperature fuel cell, a solid oxide fuel cell (SOFC) or a molten carbonate fuel cell (MCFC).

Figure 6:
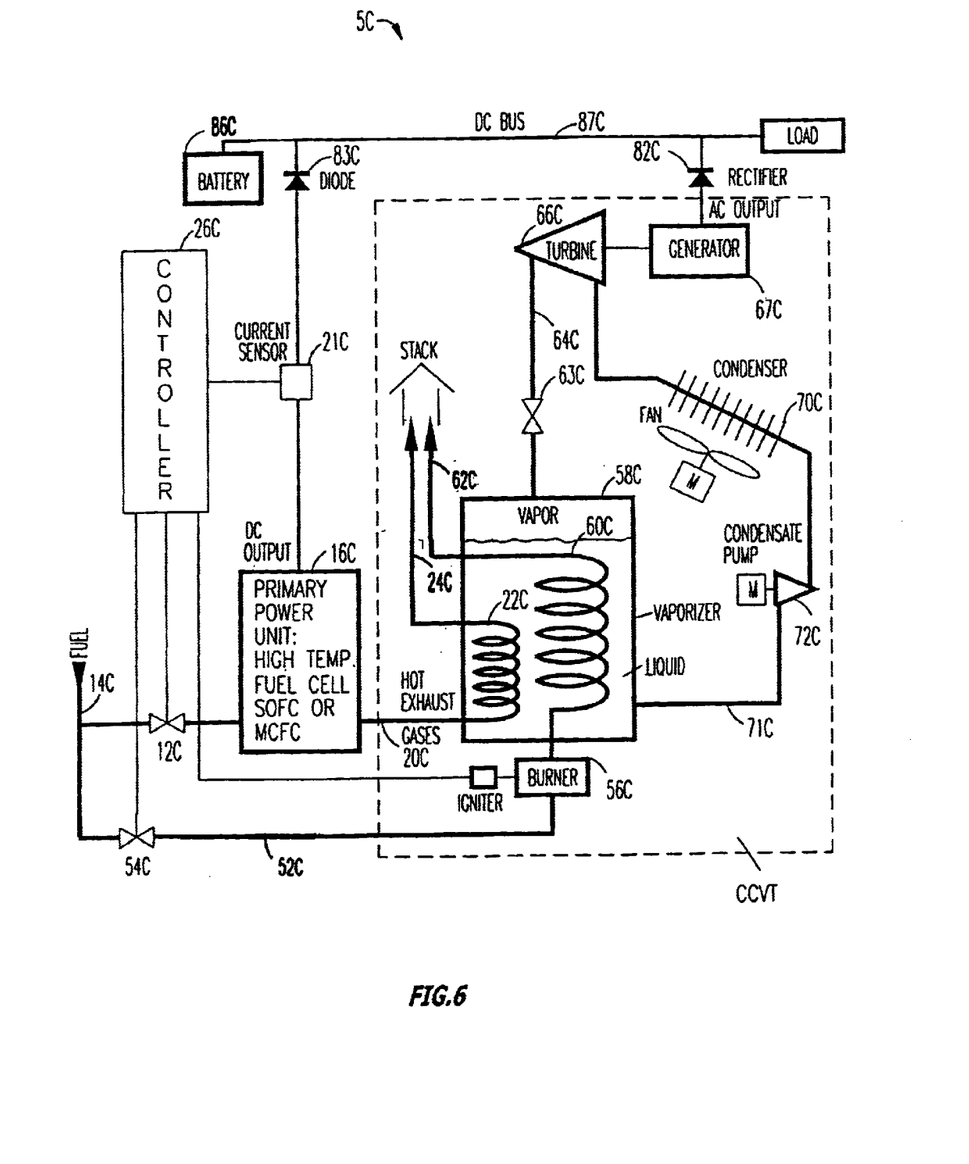
FIG. 6 is a schematic diagram of a further embodiment of the present invention.

Referring now to FIG. 6, reference numeral 5C of FIG. 6 designates a further embodiment of the present invention. This embodiment of the hybrid ultra reliable power generating system is substantially similar to the embodiment as described with respect to FIG. 5; however, in this embodiment, a battery is provided in order to maintain electrical output to the load while the secondary CCVT is coming on-line. The embodiment represented by FIG. 6 has primary power unit 16C and a secondary power unit that is a closed cycle vapor turbogenerator (CCVT) system which operates according to a Rankine cycle using steam or organic working fluid and is and is maintained in warm standby by the exhaust gases of primary power unit 16C.

Fuel is supplied to the primary power unit 16C by fuel supply line 14C via fuel valve 12C. Fuel valve 12C is connected with controller 26C. Under normal operating conditions fuel valve 12C is open, allowing fuel to be supplied to primary power unit 16C. Hot exhaust gases containing rejected heat of primary power unit 16C are supplied to vaporizer 58C by primary power unit exhaust line 20C where heat from the hot exhaust gases is transferred to the liquid in vaporizer 58C via heat exchange device 22C. The exhaust gases from primary power unit 16C heat the working fluid in vaporizer 58C allowing the secondary closed cycle vapor turbogenerator (CCVT) system to remain in warm standby. Cooled exhaust gases exit vaporizer 58C via exhaust pipe 24C. The rejected heat in the exhaust gases is sufficient to maintain the temperature and pressure of the vaporizer at or even below the normal operating temperature and pressure. The power produced by primary power unit 16C is sensed by sensor 21C. Sensor 21C is connected to controller 26C which monitors power produced by primary power unit 16C. Under normal operating conditions, the power produced by primary power unit 16C is substantially sufficient for supplying the desired load and the power produced by the secondary CCVT system is zero. In this embodiment, the electrical output of primary power unit 16C is in the form of direct current (DC) electricity. Diode 83C maintains the flow of the DC output of primary power unit 16C to the load.

In the event of a failure of primary power unit 16C, sensor 21C detects the loss of power. Backup battery 86C supplies the necessary power to the load via DC bus 87C until the secondary CCVT is able to come on-line. Controller 26C then closes fuel valve 12C which supplies fuel to primary power unit 16C. Controller 26C then opens fuel valve 54C which is located on fuel supply line 52C. Fuel supply line 52C supplies fuel to burner 56C of the secondary CCVT system. Controller 26C sends a signal igniting burner 56C. Burner 56C heats vaporizer 58C. Combustion gases produced by burner 56C flow through vaporizer 58C via heat exchanging device 60C, with exhaust gases exiting vaporizer 58C by means of exhaust conduit 62C. Controller 26C sends a signal opening valve 63C, located on the secondary CCVT system vapor conduit 64C. Vaporized working fluid from vaporizer 58C proceeds through vapor conduit 64C to turbine 66C causing turbine 66C to do work by rotation. Generator 67C coupled to turbine 66C converts the rotational work produced into electrical power. In this embodiment, the electrical output of generator 67C is in the form of alternating current (AC) electricity. Rectifier 82C rectifies the AC output of generator 67C into a direct current (DC) output prior to the same being supplied to the load. The expanded working fluid vapor exhausted from turbine 66C is supplied by expanded working fluid vapor exhaust conduit 68C to condenser 70C. The expanded working fluid vapor is condensed in condenser 70C and condensate produced is returned to vaporizer 58C through return conduit 71C via pump 72C.

The presence of battery 86C allows for a lag time between the failure of primary power unit 16C and the coming on-line of the secondary CCVT unit. In this respect, it may not be necessary to maintain the vaporizer temperature and pressure at the operating conditions thereof since the battery will supply the power until vaporizer 58C is at its operating temperature and pressure. Preferably, however, the rejected heat from primary power unit 16C does maintain vaporizer 58C at its operating temperature and pressure in order to reduce the time in which the battery must supply the power to the load. Likewise, the presence of battery 86C means that turbine 66C need not necessarily be rotated at all; however it is preferable to have turbine 66C rotating in order to reduce the lag time.

In this embodiment of the present inventive subject matter, primary power unit 16C may be, without limitation, a high temperature fuel cell, a solid oxide fuel cell (SOFC) or a molten carbonate fuel cell (MCFC).

While the use of a battery (usually a relatively small one) is described with reference to the present embodiment, such use may take place with any other embodiment herein described wherein the secondary CCVT will be maintained in warm standby rather than hot standby.

Figure 7:
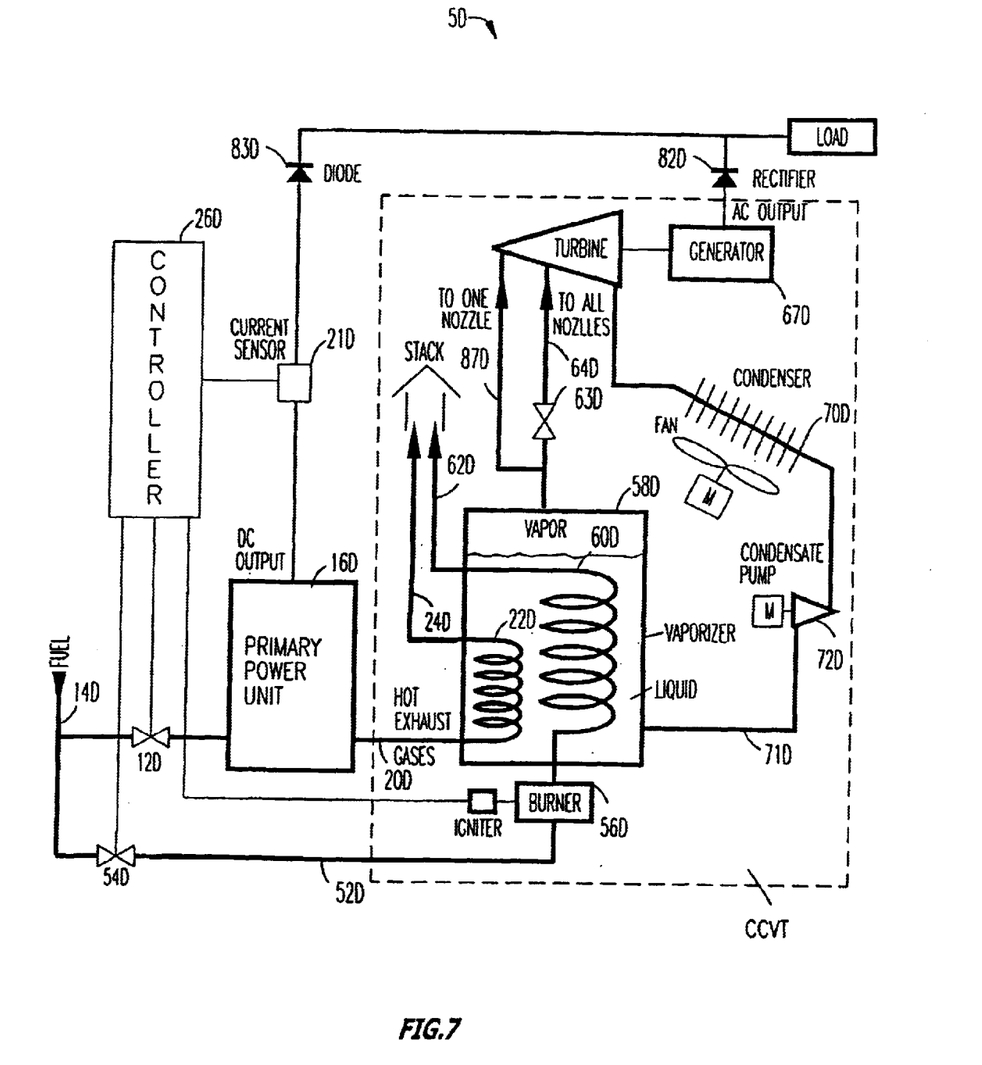
FIG. 7 is a schematic diagram of a still further embodiment of the present invention.

Referring now to FIG. 7, reference numeral 5D of FIG. 7 designates a further embodiment of the present invention. This embodiment of the hybrid ultra reliable power generating system is substantially similar to the embodiment as described with respect to FIGS. 3 and 4; however, in this embodiment, the primary power unit may be any power unit previously described, and in lieu of an orifice for allowing vapor to be supplied to the turbine during normal operation, a bypass conduit supplies vapor to only one or several nozzle(s) of the turbine. The embodiment represented by FIG. 7 has primary power unit 16D and a secondary power unit that is a closed cycle vapor turbogenerator (CCVT) system which operates according to a Rankine cycle using steam or organic working fluid and is maintained in hot standby by the exhaust gases of primary power unit 16D.

Fuel is supplied to the primary power unit 16D by fuel supply line 14D via fuel valve 12D. Fuel valve 12D is connected with controller 26D. Under normal operating conditions fuel valve 12D is open, allowing fuel to be supplied to primary power unit 16D. Hot exhaust gases containing rejected heat of primary power unit 16D are supplied to vaporizer 58D by primary power unit exhaust line 20D where heat from the hot exhaust gases is transferred to the liquid in vaporizer 58D via heat exchange device 22D. The exhaust gases from primary power unit 16D heat the working fluid in vaporizer 58D allowing the secondary closed cycle vapor turbogenerator (CCVT) system to remain in hot standby. Exhaust gases of primary power unit 16D exit vaporizer 58D via exhaust pipe 24D. The rejected heat in the exhaust gases is sufficient to maintain the temperature and pressure of the vaporizer above the normal operating temperature and pressure. The power produced by primary power unit 16D is sensed by sensor 21D. Sensor 21D is connected to controller 26D which monitors power produced by primary power unit 16D. Under normal operating conditions, the power produced by primary power unit 16D is substantially sufficient for supplying the desired load and the power produced by the secondary CCVT system is zero. In this embodiment, the electrical output of primary power unit 16D is in the form of direct current (DC) electricity. Diode 83D maintains the flow of the DC output of primary power unit 16D to the load.

In the event of a failure of primary power unit 16D, sensor 21D detects the loss of power. Controller 26D closes fuel valve 12B which supplies fuel to primary power unit 16D. Controller 26D then opens fuel valve 54D which is located on fuel supply line 52D. Fuel supply line 52D supplies fuel to burner 56D of the secondary CCVT system. Controller 26D sends a signal igniting burner 56D. Burner 56D heats vaporizer 58D. Combustion gases produced by burner 56D flow through vaporizer 58D via heat exchanging device 60D, with exhaust gases exiting vaporizer 58D by means of exhaust conduit 62D. Controller 26D sends a signal opening valve 63D, located on the secondary CCVT system vapor conduit 64D. Vaporized working fluid from vaporizer 58D proceeds through vapor conduit 64D to turbine 66D causing turbine 66D to do work by rotation. Generator 67D coupled to turbine 66D converts the rotational work produced into electrical power. In this embodiment, the electrical output of generator 67D is in the form of alternating current (AC) electricity. Rectifier 82D rectifies the AC output of generator 67D into a direct current (DC) output prior to the same being supplied to the load. The expanded working fluid vapor exhausted from turbine 66D is supplied by expanded working fluid vapor exhaust conduit 68D to condenser 70D. The expanded working fluid vapor is condensed in condenser 70D and condensate produced is returned to vaporizer 58D through return conduit 71D via pump 72D.

Bypass conduit 87D is provided in order to allow vapor from vaporizer 58D to be supplied to one or several nozzle(s) of turbine 66D under normal operating conditions, i.e., when the secondary CCVT system is not supplying any electrical output to the load. In addition, turbine 66D is rotated during normal operating conditions in order to facilitate faster startup once primary power supply 16D fails. Preferably, turbine 66D is rotated at a speed faster than the normal operating speed in order that its rotational inertia be utilized when first supplying electricity to the load after failure of the primary power supply. The use of bypass conduit 87D for supplying vapor from vaporizer 58D to one or several of the nozzle(s) of turbine 66D facilitates the operation or idling of the turbine at a rotational speed above its nominal operating speed.

As has been stated above, it is an important aspect of this embodiment of the present inventive subject matter that the rejected heat from primary power unit 16D maintain vaporizer 58D at or above its normal operating temperature and pressure. By doing this, its thermal inertia can be utilized to ensure that vapor is continually produced and supplied to turbine 66D.

In this embodiment of the present inventive subject matter, primary power unit 16D may be any of the previously discussed power units including, without limitation, a high temperature fuel cell, a solid oxide fuel cell (SOFC), a molten carbonate fuel cell (MCFC), a diesel generator (DE or DG), a gas engine generator (GEG), a gas turbine generator (GTG), or a stirling engine generator (STE).

Figure 8:
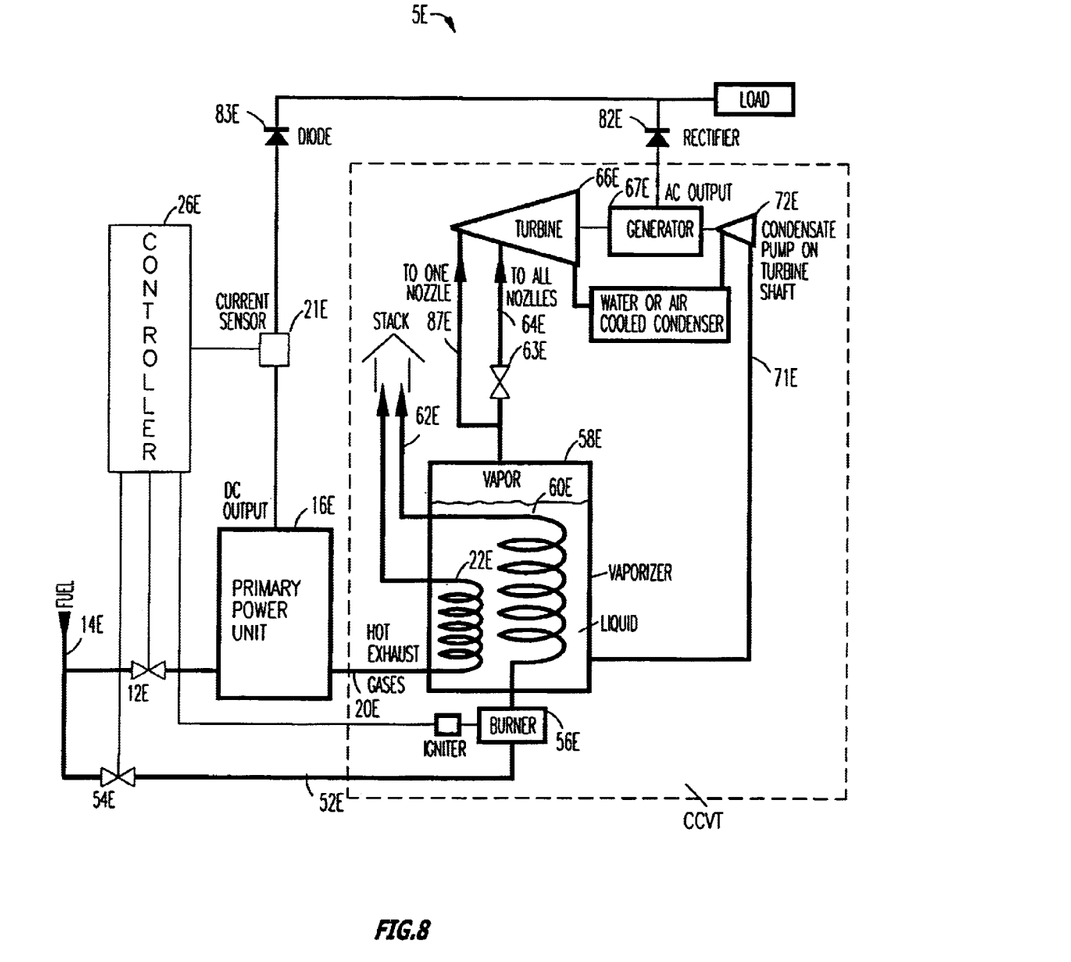
FIG. 8 is a schematic diagram of a yet further embodiment of the present invention.

Referring now to FIG. 8, reference numeral 5E of FIG. 8 designates a further embodiment of the present invention considered at present the best mode for carrying out the present invention. This embodiment of the hybrid ultra reliable power generating system is substantially similar to the embodiment as described with respect to FIG. 7; however, in this embodiment, the condenser may be water-cooled or air-cooled, and the condensate pump is on the same shaft as the generator of the CCVT. The embodiment represented by FIG. 8 has primary power unit 16E and a secondary power unit that is a closed cycle vapor turbogenerator (CCVT) system which operates according to a Rankine cycle using steam or organic working fluid and is maintained in hot standby by the exhaust gases of primary power unit 16E.

Fuel is supplied to the primary power unit 16E by fuel supply line 14E via fuel valve 12E. Fuel valve 12E is connected with controller 26E. Under normal operating conditions fuel valve 12E is open, allowing fuel to be supplied to primary power unit 16E. Hot exhaust gases containing rejected heat of primary power unit 16E are supplied to vaporizer 58E by primary power unit exhaust line 20E where heat from the hot exhaust gases is transferred to the liquid in vaporizer 58E via heat exchange device 22E. The exhaust gases from primary power unit 16E heat the working fluid in vaporizer 58E allowing the secondary closed cycle vapor turbogenerator (CCVT) system to remain in hot standby. Cooled exhaust gases exit vaporizer 58E via exhaust pipe 24E. The rejected heat in the exhaust gases is sufficient to maintain the temperature and pressure of the vaporizer above the normal operating temperature and pressure. The power produced by primary power unit 16E is sensed by sensor 21E. Sensor 21E is connected to controller 26E which monitors power produced by primary power unit 16E. Under normal operating conditions, the power produced by primary power unit 16E is substantially sufficient for supplying the desired load and the power produced by the secondary CCVT system is zero. In this embodiment, the electrical output of primary power unit 16E is in the form of direct current (DC) electricity. Diode 83E maintains the flow of the DC output of primary power unit 16E to the load.

In the event of a failure of primary power unit 16E, sensor 21D detects the loss of power. Controller 26E closes fuel valve 12B which supplies fuel to primary power unit 16E. Controller 26E then opens fuel valve 54E which is located on fuel supply line 52E. Fuel supply line 52E supplies fuel to burner 56E of the secondary CCVT system. Controller 26E sends a signal igniting burner 56E. Burner 56E heats vaporizer 58E. Combustion gases produced by burner 56E flow through vaporizer 58E via heat exchanging device 60E, with exhaust gases exiting vaporizer 58E by means of exhaust conduit 62E. Controller 26E sends a signal opening valve 63E, located on the secondary CCVT system vapor conduit 64E. Vaporized working fluid from vaporizer 58E proceeds through vapor conduit 64E to turbine 66E causing turbine 66E to do work by rotation. Generator 67E coupled to turbine 66E converts the rotational work produced into electrical power. In this embodiment, the electrical output of generator 67E is in the form of alternating current (AC) electricity. Rectifier 82E rectifies the AC output of generator 67E into a direct current (DC) output prior to the same being supplied to the load. The expanded working fluid vapor exhausted from turbine 66E is supplied by expanded working fluid vapor exhaust conduit 68E to condenser 70E. The expanded working fluid vapor is condensed in condenser 70E and condensate produced is returned to vaporizer 58E through return conduit 71E via pump 72E. In this embodiment, pump 72E is on the same turbine shaft as generator 67E.

Bypass conduit 87E is provided in order to allow vapor from vaporizer 58E to be supplied to one nozzle of turbine 66E under normal operating condition, i.e., when the secondary CCVT system is not supplying any electrical output to the load. In addition, turbine 66E is rotated during normal operating conditions in order to facilitate faster startup once primary power supply 16E fails. Preferably, turbine 66E is rotated at a speed faster than the normal operating speed in order that its rotational inertia can be utilized when first supplying electricity to the load after failure of the primary power supply. Also here, the use of bypass conduit 87D for supplying vapor from vaporizer 58D to one or several nozzle(s) of turbine 66D facilitates the operation or idling of the turbine at a rotational speed above its nominal operating speed.

As has been stated above, it is an important aspect of this embodiment of the present inventive subject matter that the rejected heat from primary power unit 16E maintain vaporizer 58E above its normal operating temperature and pressure. By doing this, its thermal inertia can be utilized to ensure that vapor is continually produced and supplied to turbine 66E.

In this embodiment of the present inventive subject matter, primary power unit 16E may be any of the previously discussed power units including, without limitation, a high temperature fuel cell, a solid oxide fuel cell (SOFC), a molten carbonate fuel cell (MCFC), a diesel generator (DE or DG), a gas engine generator (GEG), a gas turbine generator (GTG) or a stirling engine generator (STE).

It should be pointed out that, in this embodiment, if the amount of rejected heat contained in the exhaust gases of primary power unit 16E exceeds more than that which is required by using the secondary CCVT to produce 5–10%, or even more, of the power needed to supply all the load requirement, then, if preferred, secondary CCVT system can produce electric power also during normal operating conditions. In such a case, turbine 66E is operated by vapor supplied through line 87E to one nozzle thus causing turbine 66E to do work by rotation. Generator 67E coupled to turbine 66E converts the rotational work produced into electric power that is supplied to the load via rectifier 82E converting the alternating (AC) output into a direct current (DC) output. By such operation, the efficiency of the system is improved during normal operation. In this option, when sensor 21E senses a loss in power from primary power unit 16E, controller 26E closes fuel valve 12B which supplies fuel to primary power unit 16E. Controller 26E then opens fuel valve 54E which is located on fuel supply line 52E. Fuel supply line 52E then supplies fuel to burner 56E of the secondary CCVT system. Controller 26E sends a signal igniting burner 56E. Burner 56E heats vaporizer 58E. Combustion gases produced by burner 56E flow through vaporizer 58E via heat exchanging device 60E, with exhaust gases exiting vaporizer 58E by means of exhaust conduit 62E. Controller 26E sends a signal opening valve 63E, located on the secondary CCVT system vapor conduit 64E. Vaporized working fluid from vaporizer 58E proceeds now through vapor conduit 64E to turbine 66E causing turbine 66E to continue to do work by rotation. Generator 67E coupled to turbine 66E converts the rotational work produced into electric power that is supplied to the load via rectifier 82E which converts the alternating current (AC) output to a direct current (DC) output. Now secondary CCVT supplies 100% of the power to the load. The expanded working fluid vapor exhausted from turbine 66E is supplied by expanded working fluid vapor exhaust conduit 68E to condenser 70E. The expanded working fluid vapor is condensed in condenser 70E and condensate produced is returned to vaporizer 58E through return conduit 71E via pump 72E.

While this option is described with reference to the embodiment described with reference to FIG. 8, it can be applied to the embodiments of the invention described herein.

Figure 9:
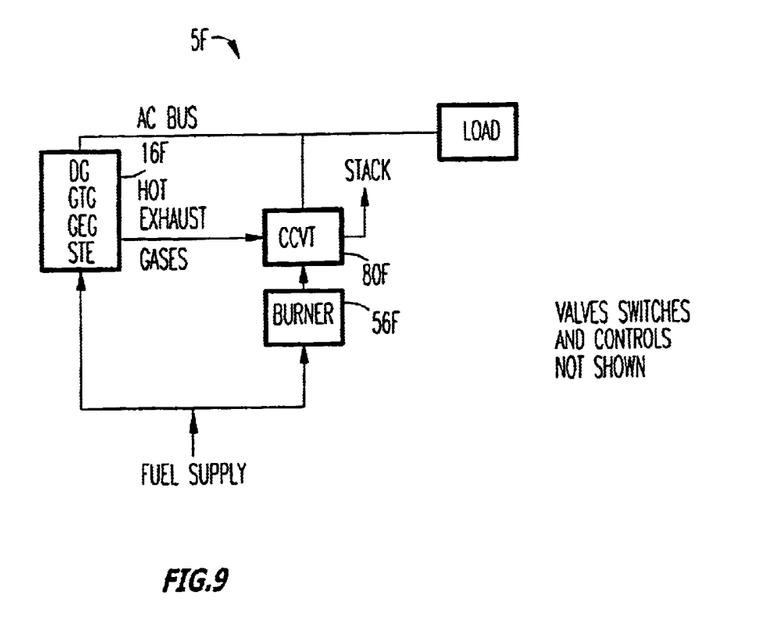
FIG. 9 is a schematic diagram showing an example of the general layout of an embodiment of the present invention.

Thus, it can be seen from the above description the present invention discloses a primary power unit producing electric power that is supplied to a load and a secondary power unit in the form of a closed cycle vapor turbine (CCVT) system, which operates according to a Rankine cycle using steam or organic working fluid, that is capable of producing, 100% of the electric power that is produced by the primary power plant and which is heated in hot standby by rejected heat of the primary power plant. FIG. 9 shows an example of a general layout diagram of such a power generating system. The vaporizer of the CCVT is maintained during hot standby at a temperature above its normal operating temperature and the vapor turbine of the CCVT is maintained preferably at idle during hot standby at a rotating speed above its normal rotating speed. As shown, preferably, the CCVT includes a burner that combusts the same fuel as the primary power plant and supplies sufficient heat so that the CCVT produces 100% of power produced by said primary power plant to the load once the primary power plant stops operation.

Figure 10:
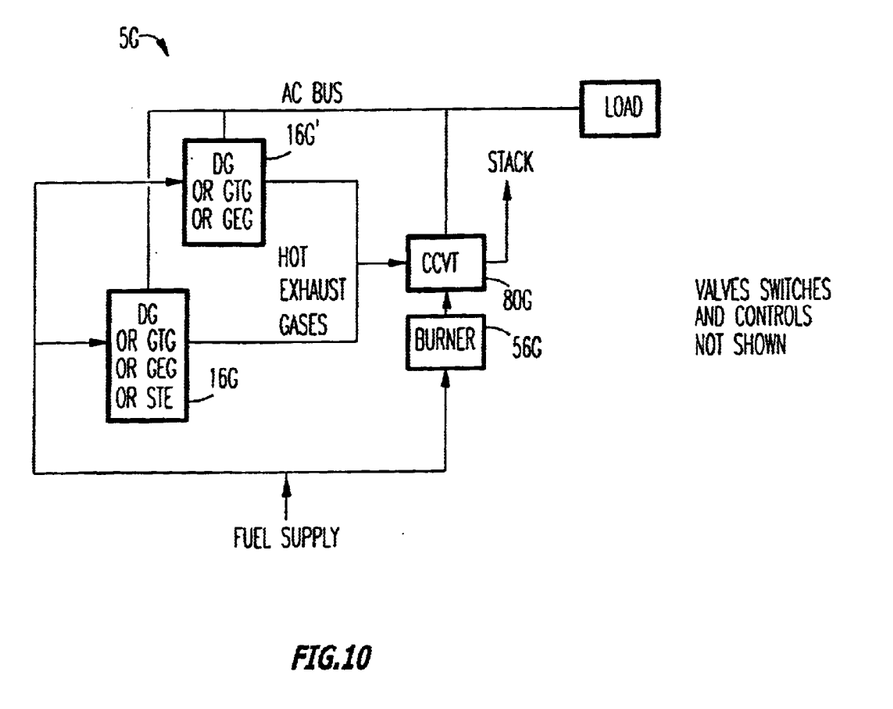
FIG. 10 is a schematic diagram showing in general an example of an embodiment of the present invention.

In addition, it should be noted that while in the above description, one primary power unit and one closed cycle vapor turbine (CCVT) are described in the each of the embodiments, more primary power units and more closed cycle vapor turbines (CCVT's) can be used in a single arrangement (see FIG. 10). However, preferably, in each arrangement, there will be usually one more primary power unit than the number closed cycle vapor turbines (CCVT's) used and FIG. 10 shows an example of such an arrangement.

Figure 11:
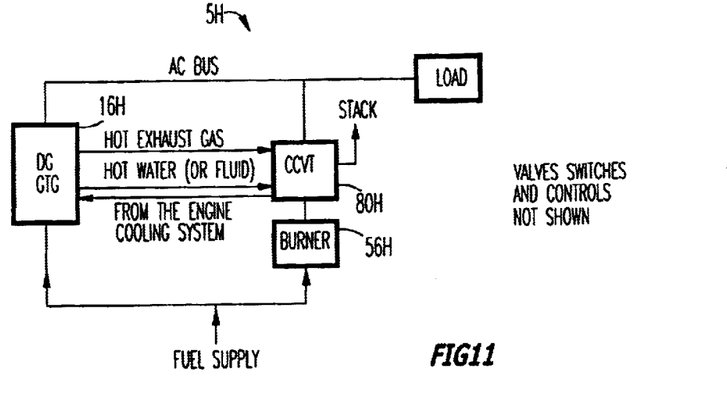
FIG. 11 is a schematic diagram showing in general an example of an even additional embodiment of the present invention.

Additionally, while the embodiments herein described describe a system wherein heat contained in the heat rejected from the primary power unit is utilized to maintain the secondary CCVT in hot standby or warm standby, other heat sources can also be used. FIG. 11 shows an example of such a system wherein heat from hot water or fluid from engine cooling system 82H of primary power unit 16H is also utilized as a heat source for secondary CCVT 80H to maintain it in hot standby or warm standby.

Figure 12:
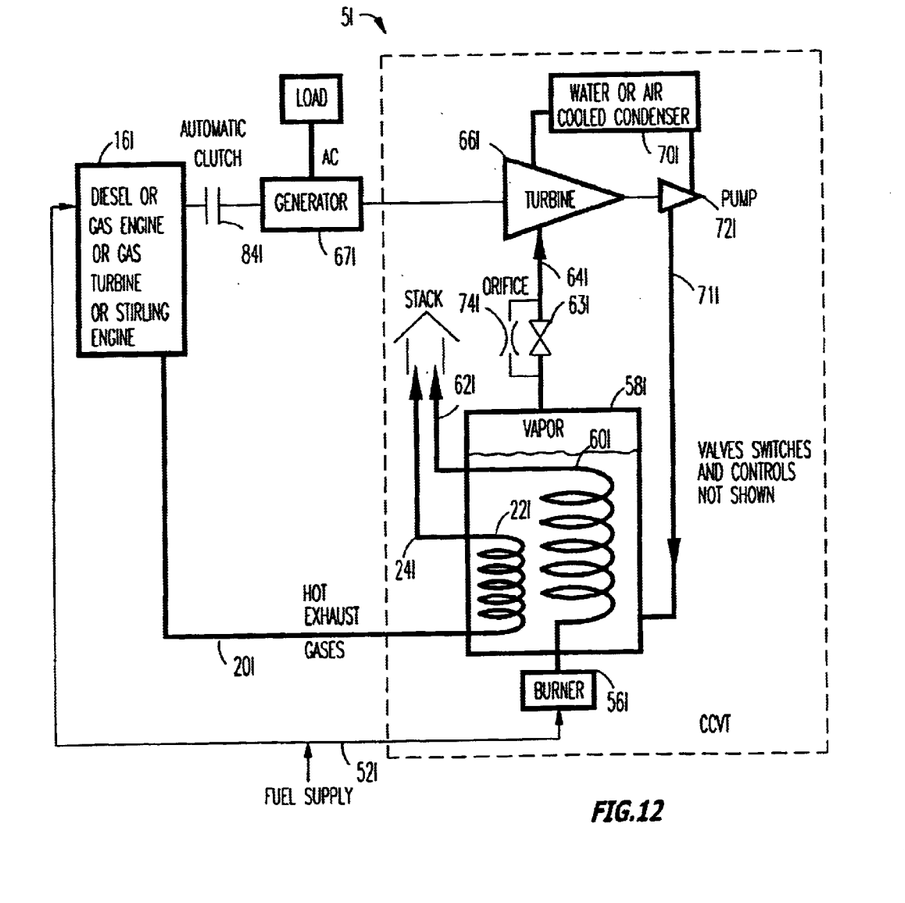
FIG. 12 is a schematic diagram showing in general a still additional embodiment of the present invention.

Furthermore, while the embodiments described above mention a separate electric generator for use together with the CCVT, if preferred, when the primary power unit comprises a diesel generator (DE or DG) a gas engine generator (GEG), a gas turbine generator (GTG), or a stirling engine generator (STE), common electrical generator 67I can be used for the primary power unit and the CCVT (see FIG. 12). In such a case, automatic cluth or selectively operable coupling 84I can be used to disconnect the output of primary power unit 16I mover from generator 67I when the primary power unit stops operation.

Thus, the present invention as herein described provides a high efficiency and reliable power generating system. This is because the primary power units described herein achieve high efficiency levels while the secondary CCVT provides this system with an ultra high level of reliability. Such a system provides the opportunity to decrease the critical feature of maintenance visits so common in diesel generator systems. By using the system and methods of the present invention, maintenance visits can be planned in a much more calm manner. This is because now it will not be so critical to reach the system when the primary power unit stops since the secondary CCVT will continue to operate and supply full or 100% of the electric power needed by the load even when the primary power unit has stopped. One will only have to pay for the fuel to operate the secondary CCVT until maintenance is carried out to the primary power unit. Consequently, such maintenance visits can now be carried during weekdays and during normal working hours rather than on weekends or during the night or other inconvenient times as when using the system of the prior art.

Furthermore, when a high temperature fuel cell, solid oxide fuel cell (SOFC) or a molten carbonate fuel cell (MCFC) are used as herein described, cartridges of the fuel cells themselves or stacks thereof can be advantageously used in accordance with the present invention. By using such fuel cell cartridges, only the cartridges need to be replaced rather than the whole fuel cell system when maintenance has to be carried out to the above mentioned fuel cell primary power unit. Such replacement cartridges will decrease the cost of maintenance for these systems and also facilitate it.

It is believed that the advantages and improved results furnished by the method and apparatus of the present invention are apparent from the foregoing description of the invention. Various changes and modifications may be made without departing from the spirit and scope of the invention as described in the claims that follow.

What is claimed is:

1. A hybrid ultra reliable power generating system comprising:
   a) a primary power unit producing electric power that is supplied to a load; and
   b) a secondary power unit in the form of a closed cycle vapor turbine (CCVT) system that is capable of producing 100% of the electric power that is produced by the primary power unit and which is heated in hot standby by rejected heat of the primary power unit, wherein the vaporizer of the CCVT is maintained during hot standby at a temperature above its nominal operating temperature and the vapor turbine of the CCVT is maintained at idle hot standby at a rotating speed above its nominal rotating speed.

2. A hybrid power generating systems according to claim 1 wherein during hot standby said CCVT does not supply any power to said load.

3. A hybrid power generating system according to claim 1 wherein said CCVT includes a burner that combusts the same fuel as supplied to the primary power unit and supplies sufficient heat so that the CCVT produces electric power that is supplied to the load at a 100% level of power produced by said primary power unit once the primary power unit stops operation.

4. A hybrid power generating system according to claim 1 wherein said primary power unit is a high temperature fuel cell.

5. A hybrid power generating system according to claim 1 wherein said primary power unit is a solid oxide fuel cell.

6. A hybrid power generating system according to claim 1 wherein said primary power unit is a molten carbonate fuel cell.

7. A hybrid power generating system according to claim 1 wherein said primary power unit is a diesel generator.

8. A hybrid power generating system according to claim 1 wherein said primary power unit is a engine generator.

9. A hybrid power generating system according to claim 1 wherein said primary power unit is a gas turbine generator.

10. A hybrid power generating system according to claim 1 wherein said primary power unit is a stirling engine generator.

11. A hybrid power generating system according to claim 1 wherein said CCVT is a closed vapor turbine operating according to an organic Rankine cycle.

12. A hybrid power generating system according to claim 1 wherein said CCVT is a closed vapor turbine operating according to a steam Rankine cycle.

13. A hybrid power generating system according to claim 4 wherein said high temperature fuel cell comprises a replaceable fuel cell cartridge.

14. A hybrid power generating system according to claim 1 wherein said secondary CCVT system produces electric power that is supplied to the load when said said primary power unit is operating, wherein the level of electric power of said secondary CCVT is at least about 5–10% of the electric power level produced by said primary unit.

15. A method of generating continuous power using a hybrid ultra reliable power generating system comprising:
   a) providing a primary power unit producing electric power that is supplied to a load; and
   b) providing a secondary power unit in the form of a closed cycle vapor turbine (CCVT) systems that is capable of producing 100% of the electric power that is produced by the primary power unit and which is heated in hot standby rejected heat of the primary power unit, wherein the vaporizer of the CCVT is maintained during hot standby at a temperature above nominal operating temperature and the vapor turbine of the CCVT is maintained at idle during hot standby at a rotating speed above its nominal rotating speed.

16. A method according to claim 15 wherein the step of providing a secondary power unit in the form of a closed cycle vapor turbine (CCVT) system that is capable of producing 100% of the electric power that is produced by the primary power unit and which is heated in hot standby by rejected heat of the primary power unit is carried out such that said secondary CCVT does not supply electric power to the load during hot standby.

17. A method according to claim 15 including the step of providing a burner that combusts the same fuel as supplied to said primary power unit and that supplies sufficient heat so that the CCVT produces electric power that is supplied to the load at a 100% level of power produced by said primary unit once the primary power unit stops operation.

18. A method according to claim 15 including the step of providing a high temperature fuel as the primary power unit.

19. A method according to claim 15 including the step of providing a diesel generator as the primary unit.

20. A method according to claim 15 including the step of providing a closed cycle vapor turbine operating according to an organic Rankine cycle as the secondary CCVT.

* * * * *